United States Patent
Sauerland

(10) Patent No.: US 6,666,094 B1
(45) Date of Patent: Dec. 23, 2003

(54) METHOD AND DEVICE FOR CONTACTLESS ONLINE MEASURING OF THE WALL THICKNESS OF HOT-ROLLED PIPES

(75) Inventor: Martin Sauerland, Mönchengladbach (DE)

(73) Assignee: SMS Demag AG, Düsseldorf (DE)

( * ) Notice: Subject to any disclaimer, the term of this patent is extended or adjusted under 35 U.S.C. 154(b) by 120 days.

(21) Appl. No.: 09/710,191

(22) Filed: Nov. 10, 2000

(30) Foreign Application Priority Data

Nov. 17, 1999 (DE) ......................... 199 55 136

(51) Int. Cl.[7] ............................................. G01N 29/04
(52) U.S. Cl. ........................ 73/618; 73/599; 73/602; 73/622
(58) Field of Search .................. 73/618, 622, 627, 73/628, 633, 584, 599, 600, 602

(56) References Cited

U.S. PATENT DOCUMENTS

| | | | | |
|---|---|---|---|---|
| 3,599,478 A | * | 8/1971 | Weinbaum | 73/611 |
| 5,048,341 A | * | 9/1991 | Lundell et al. | 73/620 |
| 5,153,677 A | * | 10/1992 | Keck et al. | 356/482 |
| 5,218,868 A | * | 6/1993 | Yamazaki et al. | 73/622 |
| 5,469,743 A | * | 11/1995 | Zorn | 73/627 |
| 6,341,525 B1 | * | 1/2002 | Takada et al. | 73/627 |
| 6,381,546 B1 | * | 4/2002 | Starostovic | 702/36 |

* cited by examiner

Primary Examiner—Hezron Williams
Assistant Examiner—Jacques Saint-Surin
(74) Attorney, Agent, or Firm—Friedrich Kueffner

(57) ABSTRACT

In a method for contactless online measuring of the wall thickness of hot-rolled pipes in the hot state for determining undesirable inner wall structures, at least one measuring head, operating according to the laser ultrasound method, scans a segment of a wall of a pipe to be measured in a circumferential direction during or directly after a rolling process. The course of the wall of a cross-section of the pipe is then reconstructed with a computer. The measuring head is a compact laser ultrasound measuring head adjustable relative to the pipe dimension to be measured. It has an excitation laser and an illumination laser and optical elements for collecting a carrier light containing the ultrasound signal and reflected at a surface of the pipe. The excitation and illumination lasers and the optical elements are arranged in a common housing of the measuring head. A pivot device is provided to pivot the laser ultrasound measuring head across a segment of the pipe in the circumferential direction.

15 Claims, 4 Drawing Sheets

METHOD AND DEVICE FOR CONTACTLESS ONLINE MEASURING OF THE WALL THICKNESS OF HOT-ROLLED PIPES

BACKGROUND OF THE INVENTION

1. Field of the Invention

The invention relates to a method and a device for contactless online measuring of the wall thickness of hot pipes for detecting undesirable inner wall structures such as inner polygons etc. of hot-rolled, in particular, stretch-reduced pipes.

2. Description of the Related Art

In the manufacture of seamless and welded steel pipes it is conventional to employ the so-called stretch reduction method in order to produce in a very flexible way, based on a few semi-finished product dimensions, a plurality of diameters and wall thicknesses of finished pipe sizes. The advantage of this method, which does not require inner tools, resides in the quick and inexpensive variation of the wall thickness and the diameter.

The deformation of the pipe blank is carried out in a plurality of sequentially arranged roll stands wherein by speed variations in the individual stands a defined tension between the roll stands is produced and thus the wall thickness of the finished pipe can be adjusted in a directed way. The shaping within the stretch reduction rolling mill is nowadays carried out generally in three-roll or four-roll stands whose pass is not circular but oval on three or four sides. This form of the pass is generally unavoidable, and only the last pass of such roll stands is generally circular because the finish-rolled pipe should be substantially of a round and circular shape.

As a result of the oval pass there are often distinct irregularities in the cross-sectional wall thickness of the stretch-reduced pipe. These irregularities of the wall thickness have different shapes. For example, for a three-roll stand they have a hexagonal shape and are referred to as inner polygon. In a four roll stand the shape is octagonal. Like all other deviations of the wall thickness, the inner polygon formation also means a quality loss.

Since the inner polygon formation is the function of the wall thickness or, in more precise terms, of the ratio wall thickness to pipe diameter, it is actually necessary to provide different passes for the rolls, i.e., different oval appearances of the roll pass, for producing a large wall thickness range. However, since the making available of roll stands requires a considerable expenditure, in general, only two different passes are used, one round pass with minimal oval appearance of the pass opening for thick-walled pipes as well as:one oval pass with large oval appearance of the pass opening for thin-walled pipes. Otherwise, it is attempted to keep the occurring inner hexagon formation as small as possible by adjusting the average tension stress or the "tension" in the rolling stock during deformation optimally. This is so because it was found by experimentation that the degree of polygon formation changes as a function of tension. Once this tension optimization has been carried out laboriously, it is still not possible to obtain at all times pipes with minimal inner polygon because momentary unavoidable changes of the influencing parameters occur, i.e., an inner polygon formation as a result of momentarily changing deformation conditions as well as a considerable expenditure had to be accepted in order to perform an optimization prior to production.

Seamless steel pipes are conventionally produced in three deformation steps including hole punching in a cross-rolling mill, stretching in an "Assel" rolling mill, a continuum rolling mill or other rolling mills, and finish-rolling in a stretch-reduction rolling mill. All three deformation steps cause the pipe wall to have characteristic, undesirable deviations from the nominal dimensions which are overlaid by each successive deformation step and in this overlaid form are found in the wall of the stretch-reduced pipe. For example, in a two-roll cross-rolling mill, two thickened wall portions are formed which extend spirally about the pipe which, in a cross-section of the pipe, are expressed as a circumferential eccentric shape. When the second deformation step is carried out on an "Assel" rolling mill, it is also possible that spirally extending thickened wall portions result which extend either in the same direction but with different pitch about the pipe or have an oppositely arranged rotational direction and may cross the spirals of the cross-rolling mill.

On the other hand, in the case of a stretch-reduced pipe which has been pre-rolled in a continuum rolling mill, a quadrangle formation can occur in addition to the inner polygon of SRR (stretch reduction rolling) and the circumferential eccentric shape of the cross-rolling process. This quadrangle formation can be detected with respect to its phase position at the SRR exit so that a precondition is provided for counteracting these inner disturbances.

The problem of the undesirable wall structures occurring in pipes could be solved if it were possible during the production process to perform a correction of the inner flaw formation by means of the control circuit, for example, by variation of the tension parameters (change of the speed series). Since, as is known in the art, between the parameter of tension distribution and the inner polygon formation a definite correlation exists, the inner polygon formation could be automatically reduced without affecting the wall thickness of the semi-finished pipe. However, this requires that the course of the inner polygon formation and of the overlaying errors is known, for example, by contactless measuring of the wall thickness of the hot-rolled pipes directly after rolling when they exit the rolling mill with a constant center of the pipe. However, this requires an economical measuring method and a cost-effective measuring device which, in addition to measuring the wall thickness course across the length of the pipe or via the time for passing through, provides important information in regard to the inner polygon formations occurring during stretch reduction.

SUMMARY OF THE INVENTION

It is an object of the present invention to provide a method and a device for contactless online wall thickness measurement of the hot-rolled pipe with which the undesirable wall structures such as inner polygons, eccentric shapes, or quadrangles can be detected with minimal measuring-technological expenditure in order to be able to carry out measures for quality improvement at an early point in time.of the manufacturing process.

In accordance with the present invention, this is achieved in that, with the aid of the laser ultrasound method and by using at least one measuring head, a segment of the wall of the pipe to be measured, during or directly after the rolling process, is scanned in the circumferential direction and, optionally by mathematical analyses and symmetry considerations, the course of the wall of the pipe cross-section is reconstructed in a computer wherein, when using several measuring heads pivotable in the circumferential direction, each measuring head sweeps across a different correlated portion of the pipe wall.

With the laser ultrasound wall thickness measuring method the classic principle of ultrasound propagation time measurement is used. Based on the time of the ultrasound pulse (twice) passing through the pipe wall, the desired wall thickness will result based on the known speed of sound. Since the coupling of the ultrasound in the thickness measurement of hot walls with temperatures in the range of 1000° C. must be carried out in a contactless way at the excitation as well as the detection side, this is realized by optical methods in which the measuring head itself can remain at a thermally safe spacing from the rolling stock to be measured. High energy light pulses in the infrared range, generated by a flashlamp-pumped laser which is directed onto the rolling stock to be measured, are absorbed in the pipe surface and this results partially in an evaporation of extremely thin surface layers. As a result of the evaporation pulse, based on pulse conservation, an ultrasound pulse results in the pipe which enters the pipe wall perpendicularly to the pipe surface. The thus resulting ultrasound pulse is reflected at the inner surface of the pipe, returns to the exterior surface, is again reflected etc. so that in the rolling stock to be measured an ultrasound echo sequence of decreasing amplitude results. The reflected ultrasound pulse generates on the outer pipe surface vibrations in the sub miniature range which are then detected, again contactless, by means of a second laser in permanent light operation taking advantage of the Doppler effect. The ultrasound vibration which in comparison to the light frequency is of a low-frequency range results in a frequency modulation of the light reflected on the material surface.

The reflected light cone which is now the "carrier" of the ultrasound signal is guided via a convex lens of great light transmitting power and a light guide to the optical demodulator, a confocal Fabry-Perot interferometer, whose output signal already contains the ultrasound echo sequence. The further amplification, filtration, and signal evaluation of the ultrasound echo sequence takes place in a conventionally operating electronic ultrasound evaluation device whose output signals are the wall thickness values which are then further processed in a computer belonging to the system.

With the scanning of the segment of the pipe wall according to the invention, undesirable structures in the cross-section of the pipe which are detrimental to the pipe quality can be detected with a minimal measuring-technological expenditure. For example, when using welded loops in SRR lines, the inner polygon (hexagon or octagon), which is stationary with respect to the phase position, can be measured and thus detected with a point-shaped laser ultrasound wall thickness measuring method in a single channel embodiment, i.e., with a single measuring head. Measures for quality improvement by the rolling mill operator can be carried out as early as possible.

In one embodiment of the invention it is suggested that the measuring heads, maximally four, are distributed about the circumference of the pipe such that at least one of the measuring heads is pivoted across a certain angle segment, to be determined, as a function of the expected order of the undesirable inner structure, in the circumferential direction of the pipe. With overlaying circumferential structures (for example, for stretch reduction of "Assel" loops), it is possible to obtain with only three scanning measuring heads (three points determine a circle), wherein at least one is pivotable in the circumferential direction of the pipe, when taking advantage of symmetry properties, the same information in regard to the pipe structure as could be obtained, otherwise only with seven or more stationary measuring heads. With pivotable measuring heads or the combination of stationary and pivotable scanning measuring heads, the pipe cross-sections are reconstructed by mathematical analyses (for example, Fourier analysis) by overlaying and by symmetry considerations.

Preferably, according to a further feature of the invention the pivot cycles of the measuring heads are carried out as a function of the rolling speed. For example, for rolling times in the range of 30 seconds, relatively long pivot cycles with periods of approximately 10 seconds are sufficient in order to make visible the polygon formation.

In order to make possible the detection of deviations of the pipe wallcross-section, the one or more measuring heads are connected to an electronic evaluation device which is preferably protected and spaced at a distance to the measuring device in an electric distribution station or in a measuring booth. The measuring device includes a personal computer for the operator in the vicinity of the stretch reduction rolling mill.

In the conventionally operating electronic evaluation device, the amplification, filtration, and signal evaluation of the ultrasound echo sequence is performed, and the output signals are the wall thickness values which are further processed in the computer.

It is beneficial to employ for measuring stretch-reduced pipes, whose semi-finished pipes have been produced in a cross-rolling mill process, three measuring heads distributed uniformly about the circumference of the pipe which together are pivotable by about 70°. As has been explained above, in these pipes, downstream of the stretch reduction rolling mill, a generally circumferentially extending eccentric shape occurs, in addition to the hexagon or polygon formation, which, for three commonly pivotable measuring heads positioned at 120° spacing relative to one another, affects all three measuring heads such that for each angular position the inner eccentric shape can be determined free of the overlaying polygon.

As an alternative, according to another feature of the invention for measuring stretch-reduced pipes whose semi-finished pipes have been produced in a cross-rolling mill process, four measuring heads L1 through L4 can be uniformly distributed about the circumference of the pipe wherein at least one measuring head is pivotable about approximately 70°, wherein the latter determines the course of the eccentric wall.

Finally, the measuring method according to the invention can also be used for measuring pipes which are pre-rolled in a continuum rolling mill and stretch-reduced, wherein then according to the invention three or four measuring heads are distributed about the circumference of the pipe, wherein at least one measuring head is pivotable about approximately 90°. In the case of continuum rolling the quadrangle formation overlays the hexagon of the stretch reduction rolling mill and the circumferential eccentric shape of the cross-rolling roll, wherein the phase position of the quadrangle can be detected again at the exit of the stretch reduction rolling mill. With a maximum of four measuring heads, of which at least one is pivotable, all occurring wall irregularities can be detected and in the end controlled and compensated.

The measuring method and measuring system according to the invention can also be used for push bench devices wherein the number of channels and pivot angles of the measuring heads must be adjusted as a function of the actual structures.

The advantage of the present invention lies in that, by using at least individually pivotable measuring heads operating according to the laser ultrasound method, wherein the pivotable measuring heads detect only a portion (segment) of the pipe wall, more quality characteristics than obtainable with conventional statistic multichannel devices can be detected and can be used with a comparatively minimal number of measuring heads number by taking advantage of a priori knowledge of the rolling process. This, in the end, results in a significant cost reduction and in a more economical method.

DESCRIPTION OF THE PREFERRED EMBODIMENTS

Figure 1:
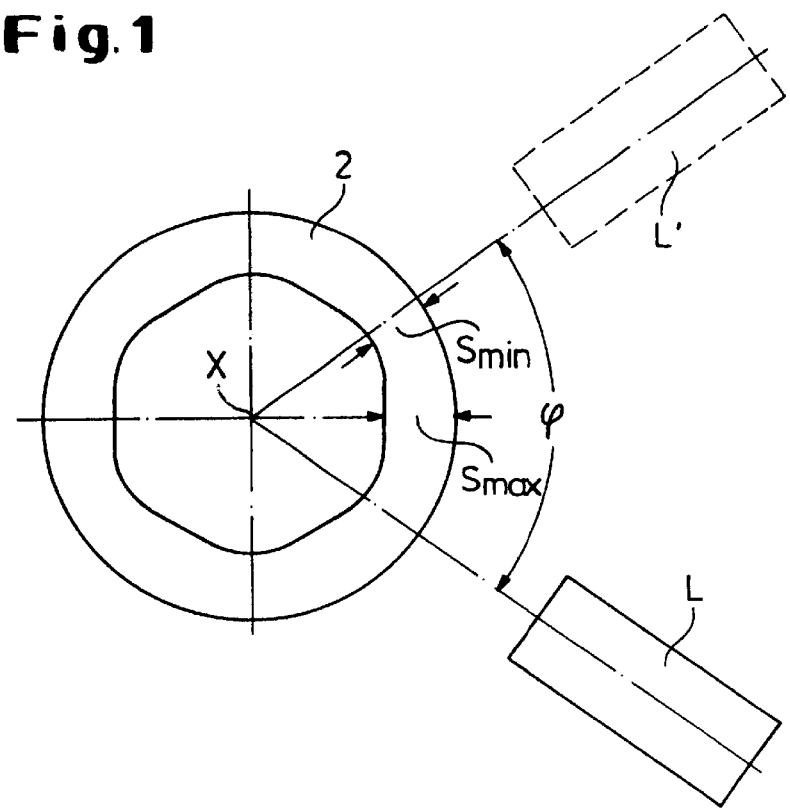
FIG. 1 shows a device according to the invention with only one measuring head.
Figure 5:
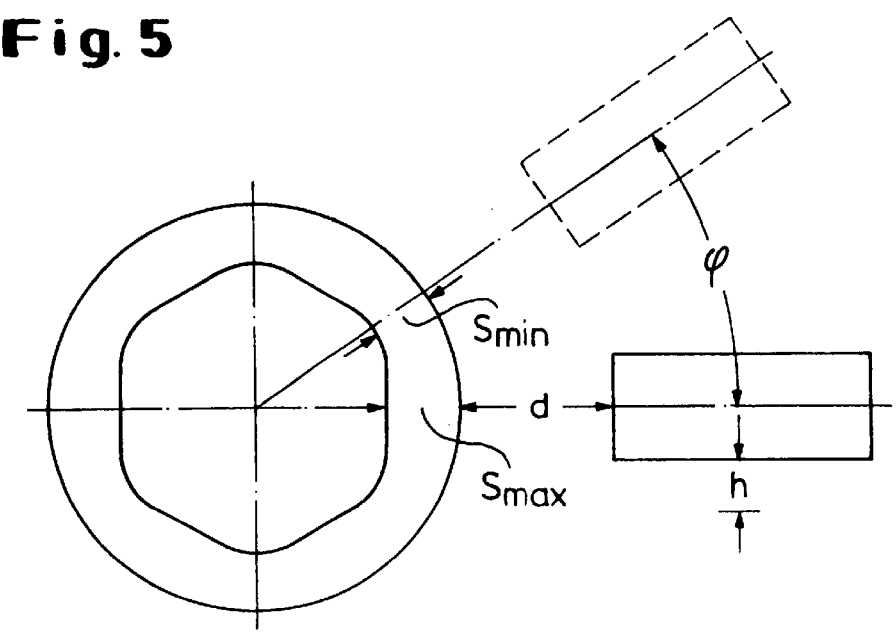
FIG. 5 show chematically the measuring head advancing mechanism and adjustment possibilities for radius and height adaptation relative to the rolling center.

FIG. 1 shows a device with only one measuring head L which can be pivoted into the position L' by the angle $\phi$ about the point of rotation X at the center of the pipe 3. The hexagonal polygon is defined by the thinnest wall $S_{min}$ and the thickest wall $S_{max}$. The shape of the polygon is regular because the center of the outer circle and the center of the polygon are located at the point of intersection X of the two center lines. In FIG. 1, a hexagonal polygon and a pivot angle $\phi$ of the scanner L of 70° is illustrated. For a hexagonal polygon a pivot angle of 30° would be sufficient, as illustrated in FIG. 5, i.e., from $S_{min}$ to $S_{max}$, in order to be able to reconstruct a complete pipe cross-section. The angle of 70° thus provides a doubled safety feature because it detects two mirror-symmetrically arranged sections of the pipe so that a comparison possibility results and a plausibility control of the measured results is possible more easily.

The actual measuring device for contactless online wall thickness measurement of hot-rolled pipes is comprised of at least one compact laser ultrasound measuring head L1 that can be adjusted relative to the pipe dimension to be measured. The excitation and illumination lasers 8 are arranged in a common housing of the measuring head L1 together with the optical elements 9 (see FIG. 4) for collecting the carrier light, which is reflected at the surface of the pipe 3 and which contains the ultrasound signal. The measuring head L1 is pivotable by means of a pivot device (not represented) about a segment of the pipe 3 in the circumferential direction. In this context it is, in principle, of no consequence which type of pivot device is used; it is only important that a pre-determined segment of the pipe circumference is measured.

Figure 2:
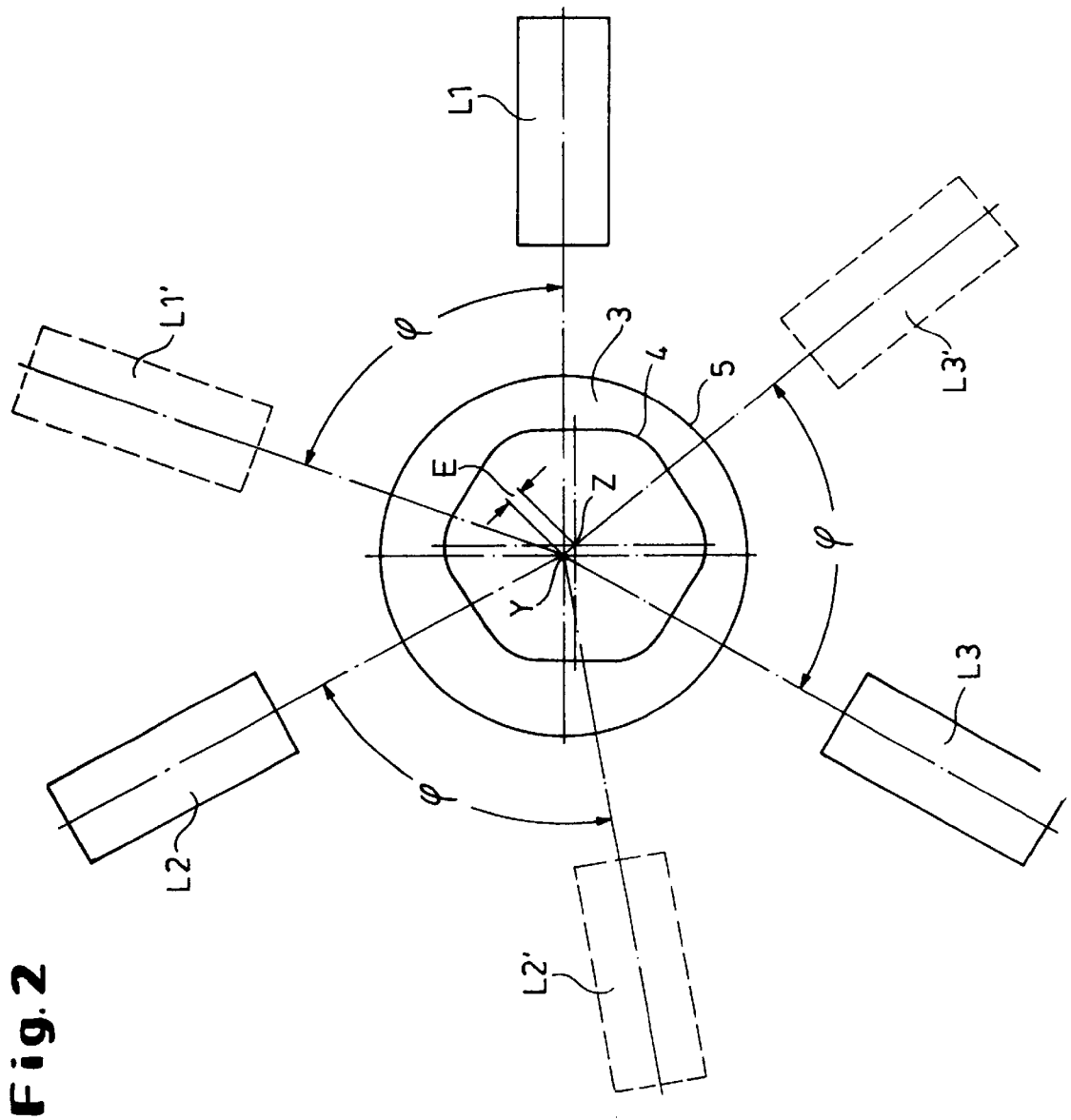
FIG. 2 shows a cross-section of the pipe with a hexagonal inner polygon.

FIG. 2 shows in this connection the cross-section of a pipe 3 with a hexagonal inner polygon 4 whose center point Z is spaced by the distance E from the center point Y of the outer circle 5. Since this eccentric shape of the pipe is formed by a circumferential spiral, the spacing E also extends in the longitudinal direction of the pipe about the center point Y with the consequence that the thinnest location $S_{min}$ and the thickest location $S_{max}$ (FIG. 1) of the pipe 3 also rotate about the center point Y. The three measuring heads L1 to L3 are distributed in the basic position at an angle of 120° about the pipe with identical spacing from the center point Y of the pipe. All three measuring heads pivot in the same direction back and forth about the angle $\phi$ about the pipe, i.e., measuring head L1 to L1', L2 to L2' etc. The measuring head L1 is illustrated in an exemplary fashion in the horizontal direction but can be adjusted in its basic position such that its pivot angle is symmetrical to the inner polygon; for a pivot angle $\phi$ of, for example, 70° slanted in the downward direction by 5°, relative to the horizontal plane.

Figure 3:
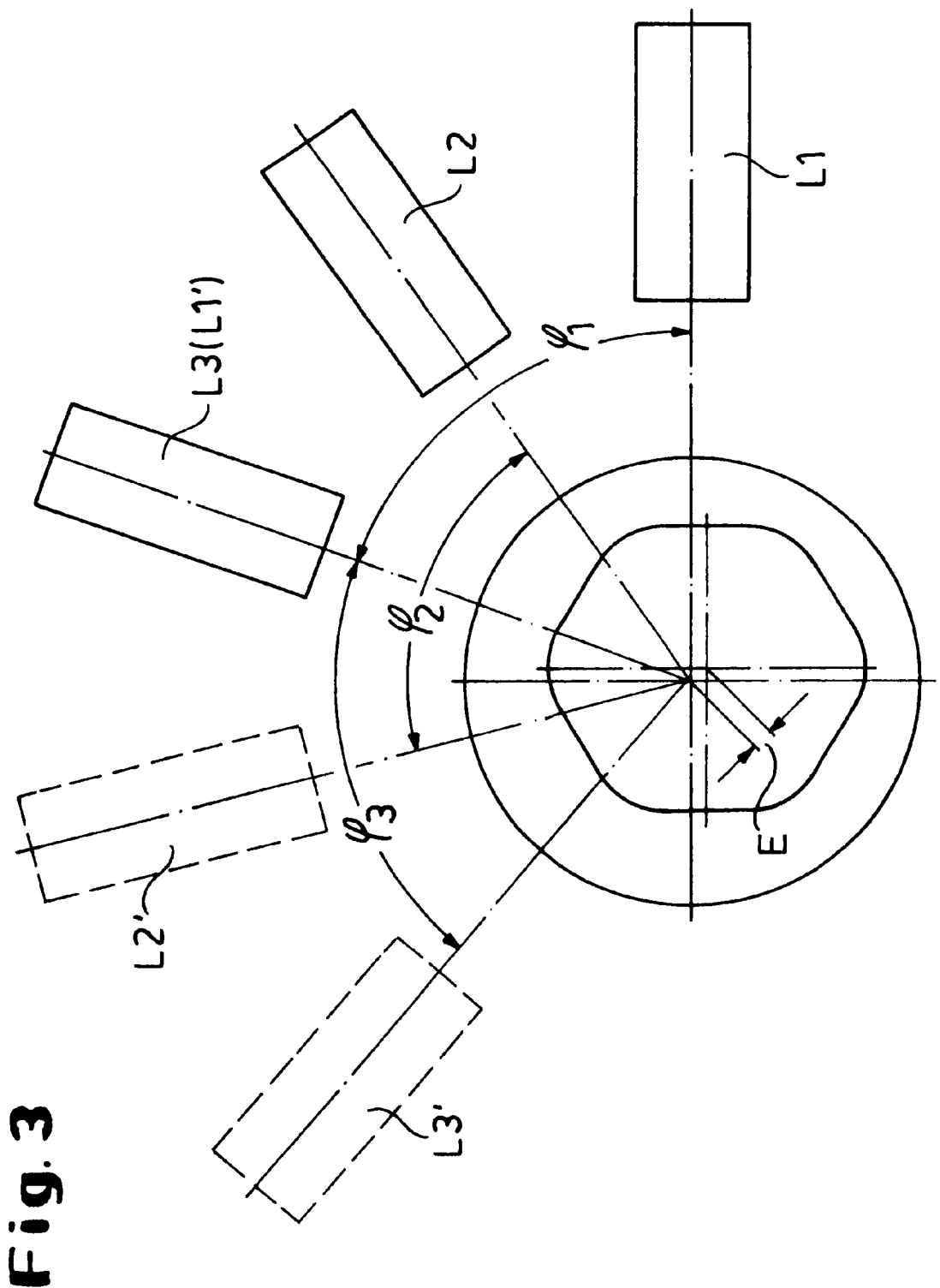
FIG. 3 shows the device according to the invention with three measuring heads.

The pivotable measuring heads L1 to L3 have the advantage that their basic angular position, respectively, their pivot angle $\phi$ can be changed during operation of the rolling process. As is illustrated in FIG. 3 in another example, the measuring heads L1 to L3 in their basic position, based on the position of FIG. 2, can be changed such that their pivot angles $\phi$ partially overlap. In FIG. 3, the three measuring heads L1 to L3 are illustrated which in the basic position are staggered relative to one another by 70°. When the scanners are now pivoted by $\phi1=\phi2=\phi3=70°$, the angle $\phi2$ is scanned twice and such that the measuring points have a defined offset relative to one another. For each surface area unit, the number of measuring points can thus be doubled or even tripled. It is thus conceivable that the operator during the operation of the rolling process adjusts the angular position of the scanners so as to deviate from the basic (normal) position, in which measurements are carried out with normal resolution, such that across a certain length of the pipe the measuring grid is condensed and, in this way, practically an enlargement of the pipe cross-section can be indicated (magnifying glass function).

Figure 4:
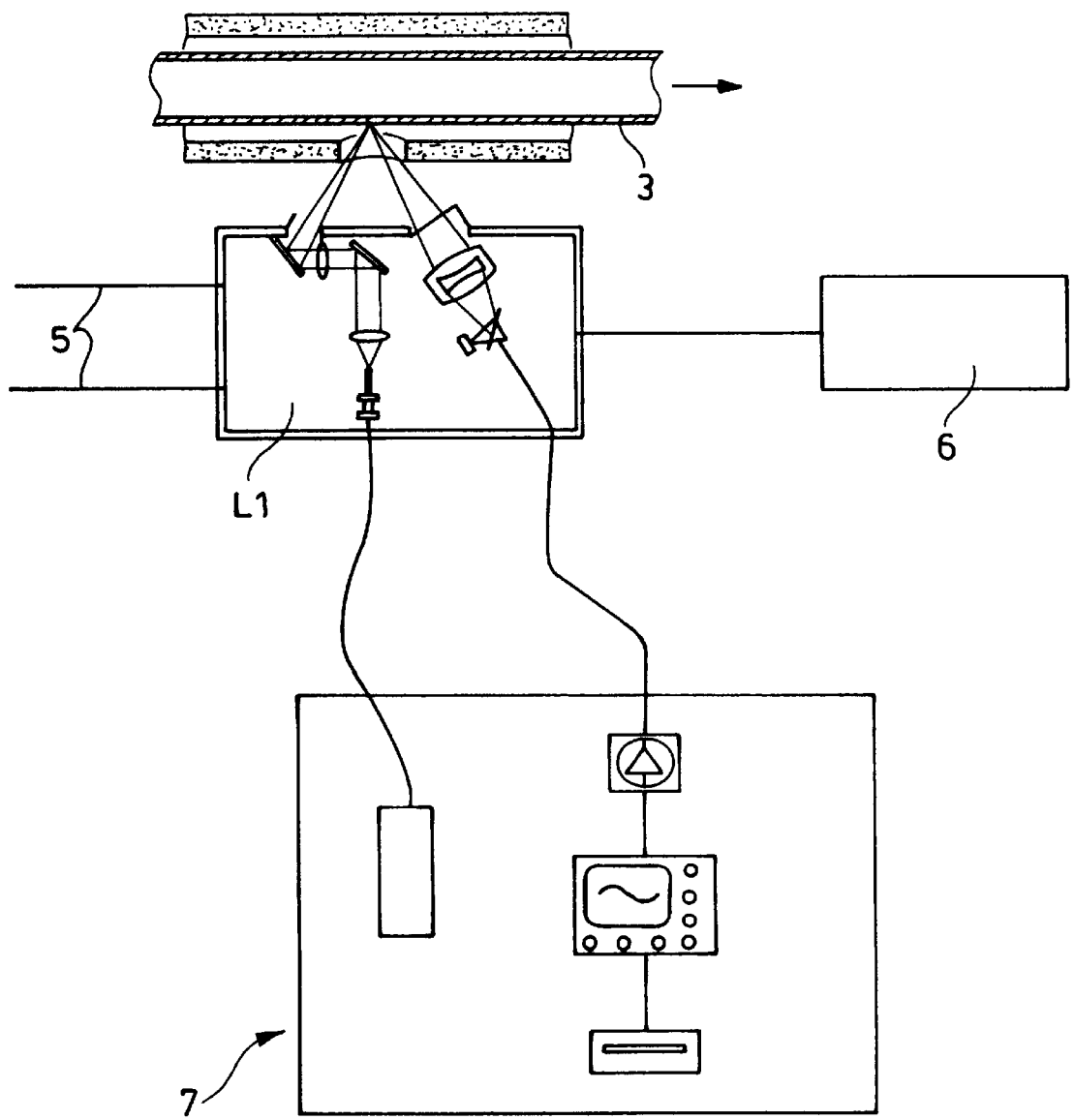
FIG. 4 explains in a schematic illustration the principle of the invention.

With the aid of the schematic illustration of FIG. 4 the principle of the invention will be explained with the example of a single channel measuring head.

The measuring system is comprised of the measuring head L1 adjustable to the diameter of the pipe 3 to be measured with corresponding supply elements 5 (compressed air, cooling water) at the site, the electronic control and evaluation device, the electric distribution station 6, as well as the personal computer of the operator on the control stage 7 of the SRR. Between measuring head L1 at the site, the electric distribution station 6, and the control stage 7 greater distances are possible. In principle, the wall thickness measuring device is configured for the rough environment of a hot-rolling facility.

The measuring head L1 with a special housing with water-cooled front side and heat-resistant window of quartz glass comprises essentially the following listed elements, not represented because they are known in the prior art:

the ultrasound-excitation branch with the head of the flashlamp-pumped Nd:YAG pulse laser and the focusing lens, the detection branch with the cw laser including controller, the infrared filter, the expanding optic with deflection mirror and deflection prism, an imaging lens with great light transmitting power for collecting the ultrasound-modulated light reflected at the pipe surface.

Also included (see FIG. 5) are in the area of the measuring head L the sensor device, also not illustrated, for recognizing the entry of the pipe for generating the start/stop signal, the measuring head advancing mechanism with pivot device and adjusting possibilities for radius and height adaptation to the rolling center (spacing h), the manual or completely automatic dimension adaptation for the pipe diameter change (spacing d), the measuring head drive device (with motor in jogging skip) with mechanical stop for servicing and the measuring position, the angle adjustment device (angle $\phi$) adjustable for an angle segment of approximately 30° in order to vary downstream of the stretch reduction rolling mill for strong polygon formation the measuring path between minimum and maximum wall, i.e., to be able to pivot the measuring head, in general, with automatic motoric angle adjustment with drive, absolute value transducer, and end position monitoring.

While specific embodiments of the invention have been shown and described in detail to illustrate the inventive principles, it will be understood that the invention may be embodied otherwise without departing from such principles.

What is claimed is:

1. A method for contactless online measuring of the wall thickness of hot-rolled pipes in the hot state for determining undesirable inner wall structures, the method comprising the steps of:

scanning with at least one measuring head, operating according to the laser ultrasound method, a segment of a wall of a pipe to be measured in a circumferential direction during or directly after a rolling process; and reconstructing a course of the wall of a cross-section of the pipe with a computer, and wherein in the step of reconstructing mathematical analyses and symmetry considerations based on an inner polygon formation of the pipe are employed, wherein in the step of scanning several of the measuring heads are used, wherein the measuring heads are pivotable in the circumferential direction, and wherein each of the measuring heads scans a different allocated segment of the wall of the pipe, and wherein, for a maximum of four measuring heads distributed about the circumference of the pipe, at least one of the measuring heads is pivotable about an angular segment in the circumferential direction of the pipe, which angular segment is to be determined as a function of an expected order of the undesirable inner structure.

2. The method according to claim 1, wherein the rolling process is a stretch reduction process.

3. The method according to claim 1, wherein the measuring heads are pivoted according to pivot cycles and wherein the pivot cycles are determined based on the rolling speed of the rolling process.

4. A device for contactless online measuring of the wall thickness of hot-rolled pipes in the hot state for determining undesirable inner wall structures, the device comprising:

at least one compact laser ultrasound measuring head configured to be adjusted relative to the pipe dimension to be measured, comprising an excitation laser and an illumination laser and optical elements configured to collect a carrier light containing the ultrasound signal and reflected at a surface of the pipe, wherein the excitation and illumination lasers and the optical elements are arranged in a common housing, and further comprising a pivot device configured to pivot the at least one laser ultrasound measuring head across a segment of the pipe in the circumferential direction, wherein, for measuring stretch-reduced pipes produced from semi-finished pipes of a cross-rolling process, three of the measuring heads are uniformly distributed about the circumference of the pipe and are commonly pivotable about approximately 70°.

5. The device according to claim 4, further comprising an electronic control and evaluation device connected to the at least one laser ultrasound measuring head.

6. The device according to claim 5, further comprising a personal computer, wherein the electronic control and evaluation device is connected to the personal computer and is configured to send output signals correlated with the wall thickness to the personal computer for processing.

7. The device according to claim 4, wherein for several measuring heads the pivot angle of the measuring heads at least partially overlap one another, respectively.

8. A device for contactless online measuring of the wall thickness of hot-rolled pipes in the hot state for determining undesirable inner wall structures, the device comprising:

at least one compact laser ultrasound measuring head configured to be adjusted relative to the pipe dimension to be measured, comprising an excitation laser and an illumination laser and optical elements configured to collect a carrier light containing the ultrasound signal and reflected at a surface of the pipe, wherein the excitation and illumination lasers and the optical elements are arranged in a common housing, and further comprising a pivot device configured to pivot the at least one laser ultrasound measuring head across a segment of the pipe in the circumferential direction, wherein, for measuring stretch-reduced pipes produced from semi-finished pipes of a cross-rolling process, three of the measuring heads are uniformly distributed about the circumference of the pipe, wherein at least one of the measuring heads is pivotable about approximately 70°.

9. The device according to claim 8, further comprising an electronic control and evaluation device connected to the at least one laser ultrasound measuring head.

10. The device according to claim 9, further comprising a personal computer, wherein the electronic control and evaluation device is connected to the personal computer and is configured to send output signals correlated with the wall thickness to the personal computer for processing.

11. The device according to claim 8, wherein for several measuring heads the pivot angle of the measuring heads at least partially overlap one another, respectively.

12. A device for contactless online measuring of the wall thickness of hot-rolled pipes in the hot state for determining undesirable inner wall structures, the device comprising:

at least one compact laser ultrasound measuring head configured to be adjusted relative to the pipe dimension to be measured, comprising an excitation laser and an illumination laser and optical elements configured to collect a carrier light containing the ultrasound signal and reflected at a surface of the pipe, wherein the excitation and illumination lasers and the optical elements are arranged in a common housing, and further comprising a pivot device configured to pivot the at least one laser ultrasound measuring head across a segment of the pipe in the circumferential direction, wherein, for measuring stretch-reduced pipes produced from semi-finished pipes produced in a continuum rolling mill, three or four of the measuring heads are distributed about the circumference of the pipe, wherein at least one of the measuring heads is pivotable about approximately 90°.

13. The device according to claim 12, further comprising an electronic control and evaluation device connected to the at least one laser ultrasound measuring head.

14. The device according to claim 13, further comprising a personal computer, wherein the electronic control and evaluation device is connected to the personal computer and is configured to send output signals correlated with the wall thickness to the personal computer for processing.

15. The device according to claim 12, wherein for several measuring heads the pivot angle of the measuring heads at least partially overlap one another, respectively.

* * * * *